United States Patent
Forey et al.

(10) Patent No.: US 10,748,236 B2
(45) Date of Patent: Aug. 18, 2020

(54) DISCARDING OF THREADS PROCESSED BY A WARP PROCESSING UNIT

(71) Applicant: ARM Limited, Cambridge (GB)

(72) Inventors: Stephane Forey, Cambridge (GB); Isidoros Sideris, Cambridge (GB); Reimar Gisbert Döffinger, Lund (SE)

(73) Assignee: ARM Limited, Cambridge (GB)

( * ) Notice: Subject to any disclaimer, the term of this patent is extended or adjusted under 35 U.S.C. 154(b) by 58 days.

(21) Appl. No.: 16/117,098

(22) Filed: Aug. 30, 2018

(65) Prior Publication Data

US 2019/0087928 A1    Mar. 21, 2019

(30) Foreign Application Priority Data

Sep. 20, 2017    (GR) .............................. 20170100422

(51) Int. Cl.

| | |
|---|---|
| *G06F 1/20* | (2006.01) |
| *G06F 9/38* | (2018.01) |
| *G06T 1/20* | (2006.01) |
| *G06F 9/52* | (2006.01) |
| *G06F 9/48* | (2006.01) |

(52) U.S. Cl.
CPC .............. *G06T 1/20* (2013.01); *G06F 9/3851* (2013.01); *G06F 9/3885* (2013.01); *G06F 9/48* (2013.01); *G06F 9/52* (2013.01); *G06T 2200/28* (2013.01)

(58) Field of Classification Search
None
See application file for complete search history.

(56) References Cited

U.S. PATENT DOCUMENTS

| | | | |
|---|---|---|---|
| 7,617,384 B1* | 11/2009 | Coon ................... | G06F 9/3851 712/220 |
| 2009/0198969 A1* | 8/2009 | Nystad ................. | G06F 9/383 712/216 |
| 2011/0078690 A1* | 3/2011 | Fahs ..................... | G06F 9/46 718/102 |
| 2013/0332939 A1 | 12/2013 | Engh-Halstvedt et al. | |
| 2014/0267272 A1 | 9/2014 | Ossowski | |
| 2014/0372731 A1* | 12/2014 | Nystad ................. | G06F 9/3802 712/207 |

(Continued)

OTHER PUBLICATIONS

Search and Examination Report for GB1718157.9, dated Apr. 30, 2018, 7 pages.

*Primary Examiner* — Joni Hsu
(74) *Attorney, Agent, or Firm* — Nixon & Vanderhye P.C.

(57) ABSTRACT

A warp processing unit controls, in dependence on a warp program counter shared between a plurality of threads processing respective graphics fragments, fetching of a next instruction to be executed for at least some of the plurality of threads. In response to a determination that a given subset of threads is to be discarded when at least one other subset of threads is to continue, the warp processing unit processes the given subset of threads in a discarded state. For a thread processed in the discarded state, execution of instructions continues for the discarded thread, and at least one of: generation of data access messages triggered by the discarded thread is suppressed; and at least one processing operation, which would be deferred until completion of the discarded thread had the thread not been discarded, is enabled to be commenced independently of an outcome of the discarded thread.

16 Claims, 9 Drawing Sheets

(56) References Cited

U.S. PATENT DOCUMENTS

| | | | | |
|---|---|---|---|---|
| 2015/0324198 A1* | 11/2015 | Alsup | ................ | G06F 9/30069 |
| | | | | 712/233 |
| 2017/0032488 A1 | 2/2017 | Nystad | | |
| 2018/0286005 A1* | 10/2018 | Koker | .................. | G06F 9/5011 |

* cited by examiner

| cycle | warp PC (44) | instruction at gPC | tPC0 (58) | thread 0 operation 0 | tPC1 (58) | thread 1 operation 1 | tPC2 (58) | thread 2 operation 2 | tPC3 (58) | thread 3 operation 3 |
|---|---|---|---|---|---|---|---|---|---|---|
| 0 | #add | ADD r2,r3,r4 | #add | 2+2=4 | #add | 1+9=10 | #add | -3+22=19 | #add | 2+8=10 |
| 1 | #add+4 | CMP r2,#19 | #add+4 | NE | #add+4 | NE | #add+4 | EQ | #add+4 | NE |
| 2 | #add+8 | BNE #add+16 | #add+8 | Y → tPC0=#add+16 | #add+8 | Y → tPC1=#add+16 | #add+8 | N → tPC2=#add+12 | #add+8 | Y → tPC3=#add+16 |
| 3 | #add+12 | MUL r5,r6,r7 | #add+16 | — | #add+16 | — | #add+12 | 3x12=36 | #add+16 | — |
| 4 | #add+16 | STR r2,base+index | #add+16 | index=0 | #add+16 | index=1 | #add+16 | index=2 | #add+16 | index=3 |

FIG. 7

| thread state | active mask bit 64 | pending mask bit 66 | discard mask bit 102 | warp action for thread |
|---|---|---|---|---|
| inactive/ terminated | 0 | 0 | 0 | power gate thread's pipeline/regs to suppress instruction execution |
| active | 1 | 0 | 0 | execute next instruction for thread |
| pending | 0 | 1 | 0 | suppress execution (or writeback) of instructions, but retain thread state in registers |
| discarded | X | X | 1 | continue instruction execution, suppress messaging/ remove from pixel dependency tracker |

FIG. 11

DISCARDING OF THREADS PROCESSED BY A WARP PROCESSING UNIT

This application and claims priority to GR Patent Application No. 20170100422 filed 20 Sep. 2017, the entire contents of which is hereby incorporated by reference.

The present technique relates to the field of graphics processing.

An apparatus for graphics processing may need to perform a number of threads of processing on respective graphics fragments. For example each thread may be a shader thread which performs shader processing on a graphics fragment to be drawn at a given pixel position within the image frame to be rendered. Some graphics processing apparatuses may have a warp processing unit which processes a number of threads in dependence on a warp program counter which is shared between the threads, with fetching of a next instruction to be executed for at least some of those threads being controlled based on the warp program counter. Since often the threads of processing performed for nearby pixel positions may be similar and may need to apply the same operations to different data input, controlling instruction execution based on a shared program counter can be efficient as it allows the fetch and decode overhead of fetching and decoding the instructions to be amortised across the batch of threads as a whole.

At least some examples provide an apparatus for graphics processing, comprising:

a warp processing unit to process a plurality of threads of processing on respective graphics fragments;

wherein the warp processing unit is configured to control, in dependence on a warp program counter shared between the plurality of threads, fetching of a next instruction to be executed for at least some of the plurality of threads;

the warp processing unit comprises registers to store architectural state data for the plurality of threads;

in response to a determination that a given subset of threads is to be discarded when at least one other subset of threads of the plurality of threads is to continue, the warp processing unit is configured to process the given subset of threads in a discarded state; and for a thread processed in the discarded state, the warp processing unit is configured to continue execution of instructions for the discarded thread, and at least one of:

the warp processing unit is configured to suppress generation of data access messages triggered by the discarded thread, said data access messages comprising messages requesting access to data other than said architectural state data stored in the registers of the warp processing unit; and the apparatus for graphics processing is configured to enable at least one processing operation, which would be deferred until completion of the discarded thread had the thread not been discarded, to be commenced independently of an outcome of the discarded thread.

At least some examples provide an apparatus for graphics processing, comprising:

means for processing a plurality of threads of processing on respective graphics fragments;

wherein the means for processing is configured to control, in dependence on a warp program counter shared between the plurality of threads, fetching of a next instruction to be executed for at least some of the plurality of threads;

the means for processing comprises means for storing architectural state data for the plurality of threads;

in response to a determination that a given subset of threads is to be discarded when at least one other subset of threads of the plurality of threads is to continue, the means for processing is configured to process the given subset of threads in a discarded state; and for a discarded thread in the discarded state, the means for processing is configured to continue executing instructions for the discarded thread, and at least one of:

the means for processing is configured to suppress generation of data access messages triggered by the discarded thread, said data access messages comprising messages requesting access to data other than said architectural state data stored in the means for storing of the means for processing; and the apparatus for graphics processing is configured to enable at least one processing operation, which would be deferred until completion of the discarded thread had the thread not been discarded, to be commenced independently of an outcome of the discarded thread.

At least some examples provide a method for graphics processing, comprising:

processing a plurality of threads of processing on respective graphics fragments using a warp processing unit configured to control, in dependence on a warp program counter shared between the plurality of threads, fetching of a next instruction to be executed for at least some of the plurality of threads, the warp processing unit comprising registers to store architectural state data for the plurality of threads; and in response to a determination that a given subset of threads is to be discarded when at least one other subset of threads of the plurality of threads is to continue, the warp processing unit processing the given subset of threads in a discarded state;

wherein for a discarded thread in the discarded state, the warp processing unit continues executing instructions for the discarded thread, and at least one of:

the warp processing unit suppresses generation of data access messages triggered by the discarded thread, said data access messages comprising messages requesting access to data other than said architectural state data stored in the registers of the warp processing unit; and at least one processing operation, which would be deferred until completion of the discarded thread had the thread not been discarded, is enabled to be commenced independently of an outcome of the discarded thread.

Further aspects, features and advantages of the present technique will be apparent from the following description of examples, which is to be read in conjunction with the accompanying drawings, in which:

FIG. 1 schematically illustrates an example of a graphics processing pipeline for processing of graphics primitives for display;

Figure 6:
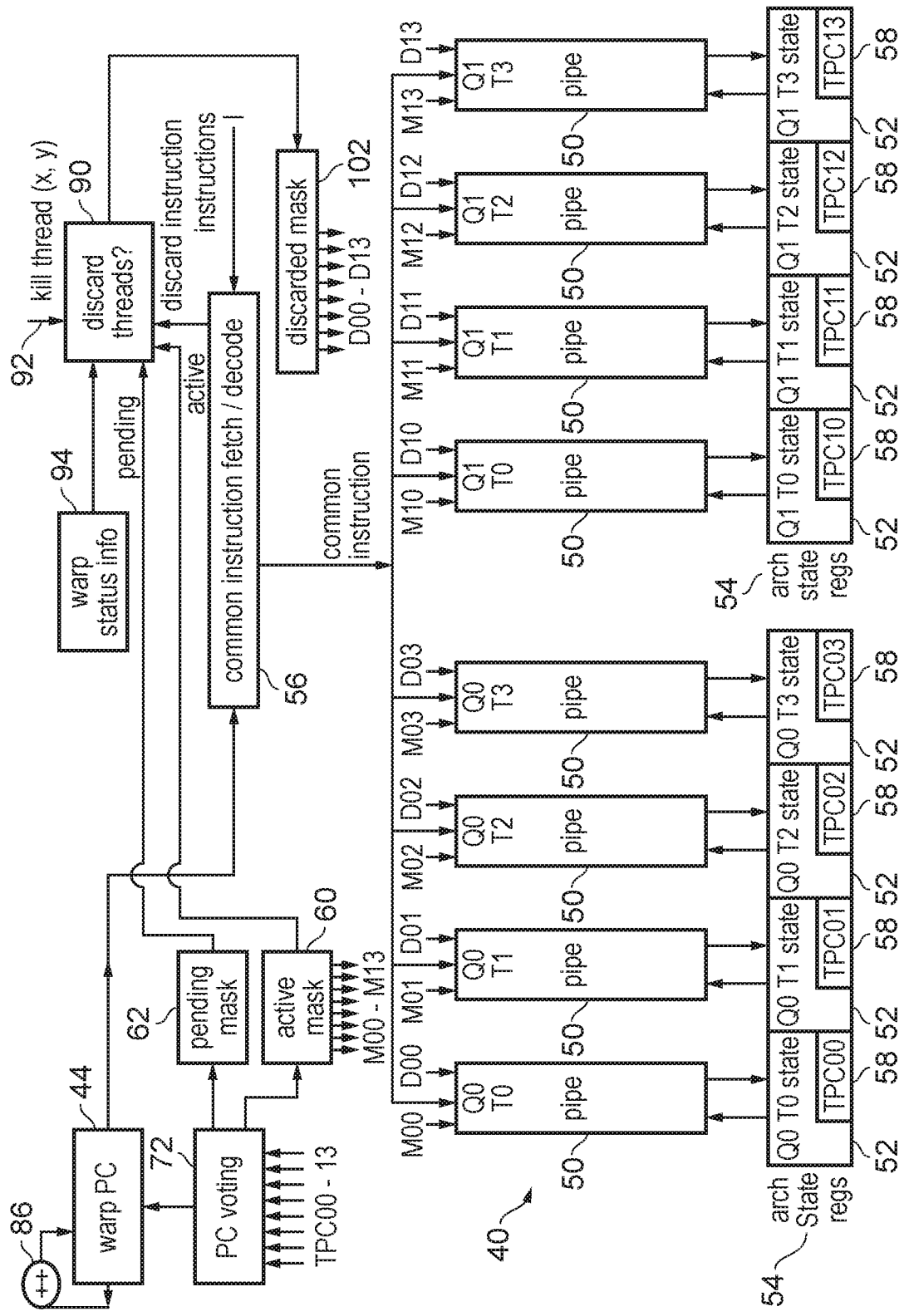
Figure 8:
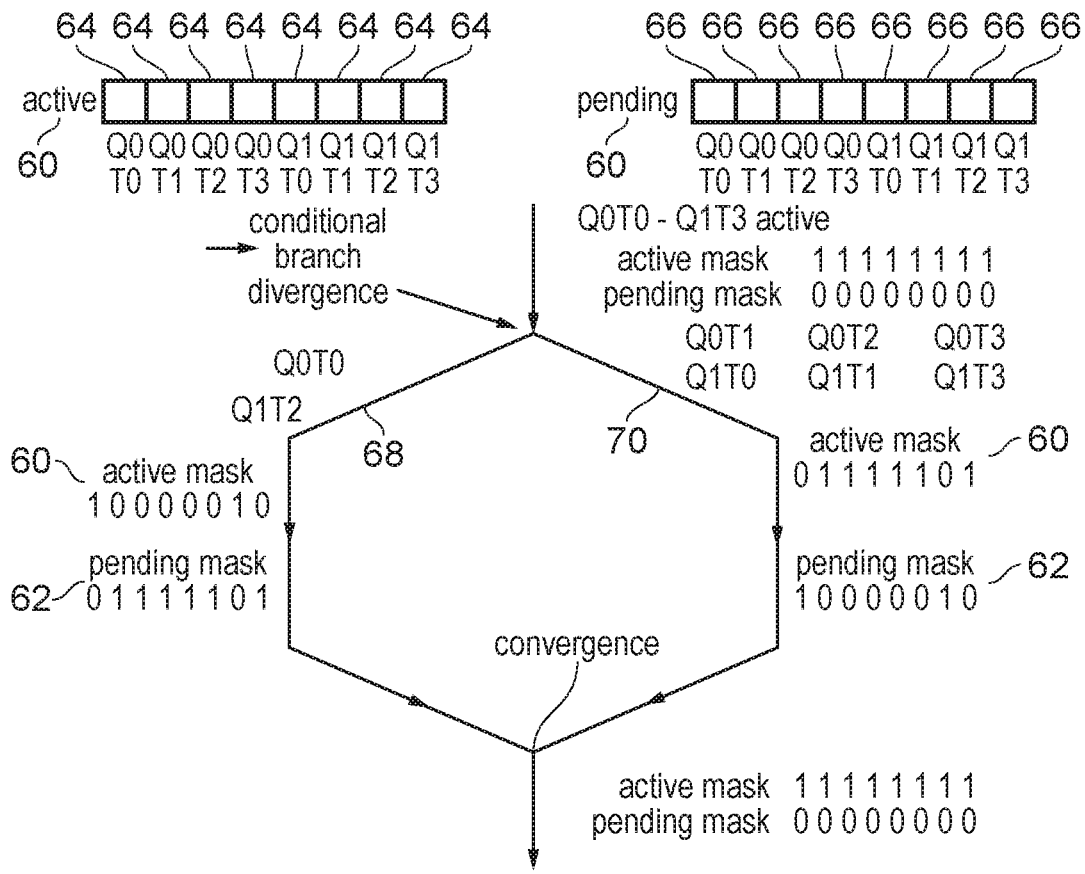
Figure 9:
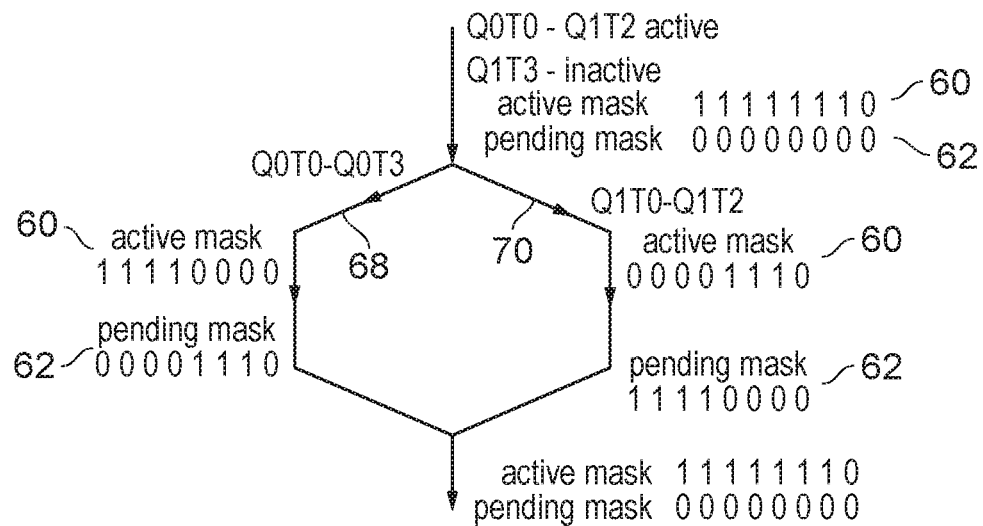
Figure 10:
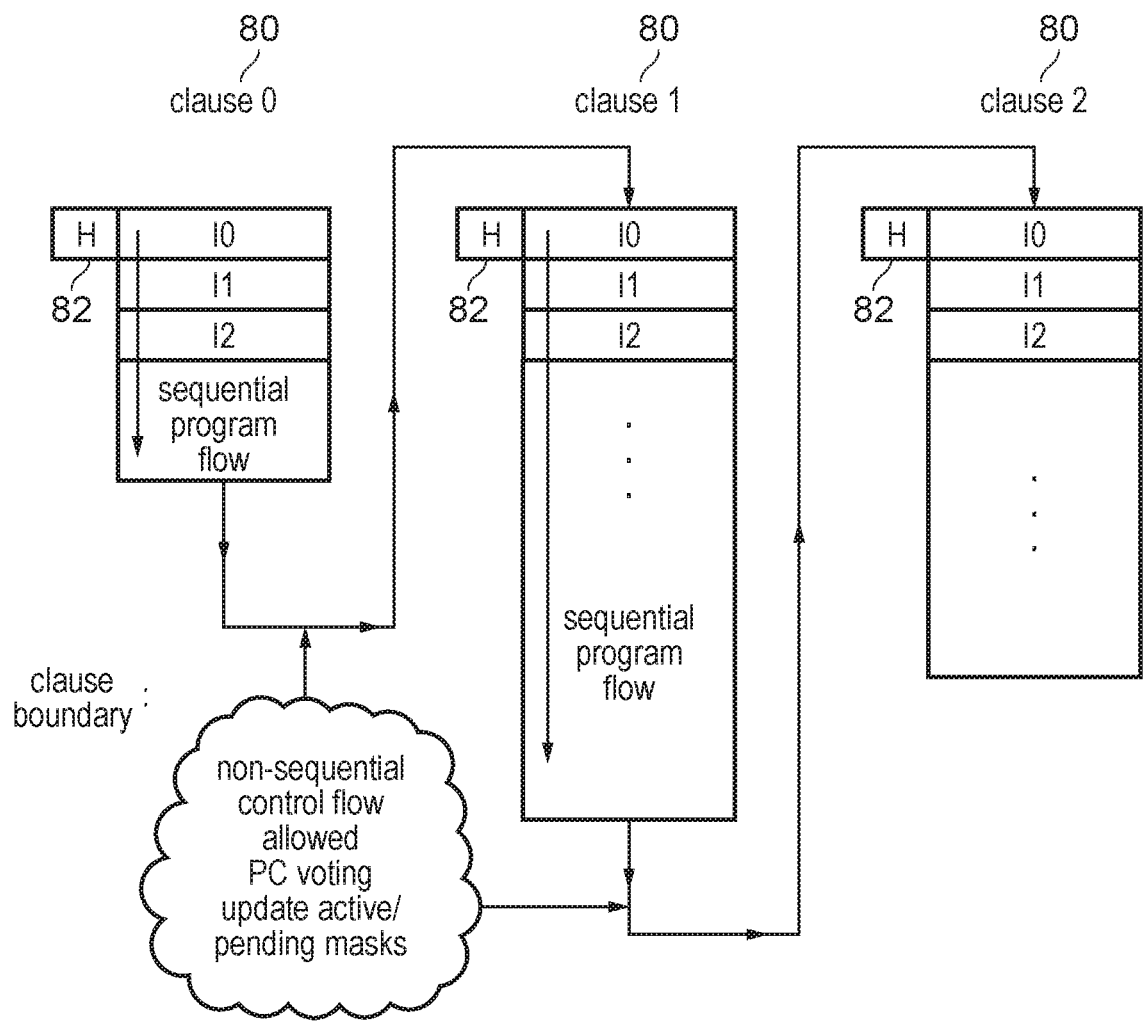
Figure 12:
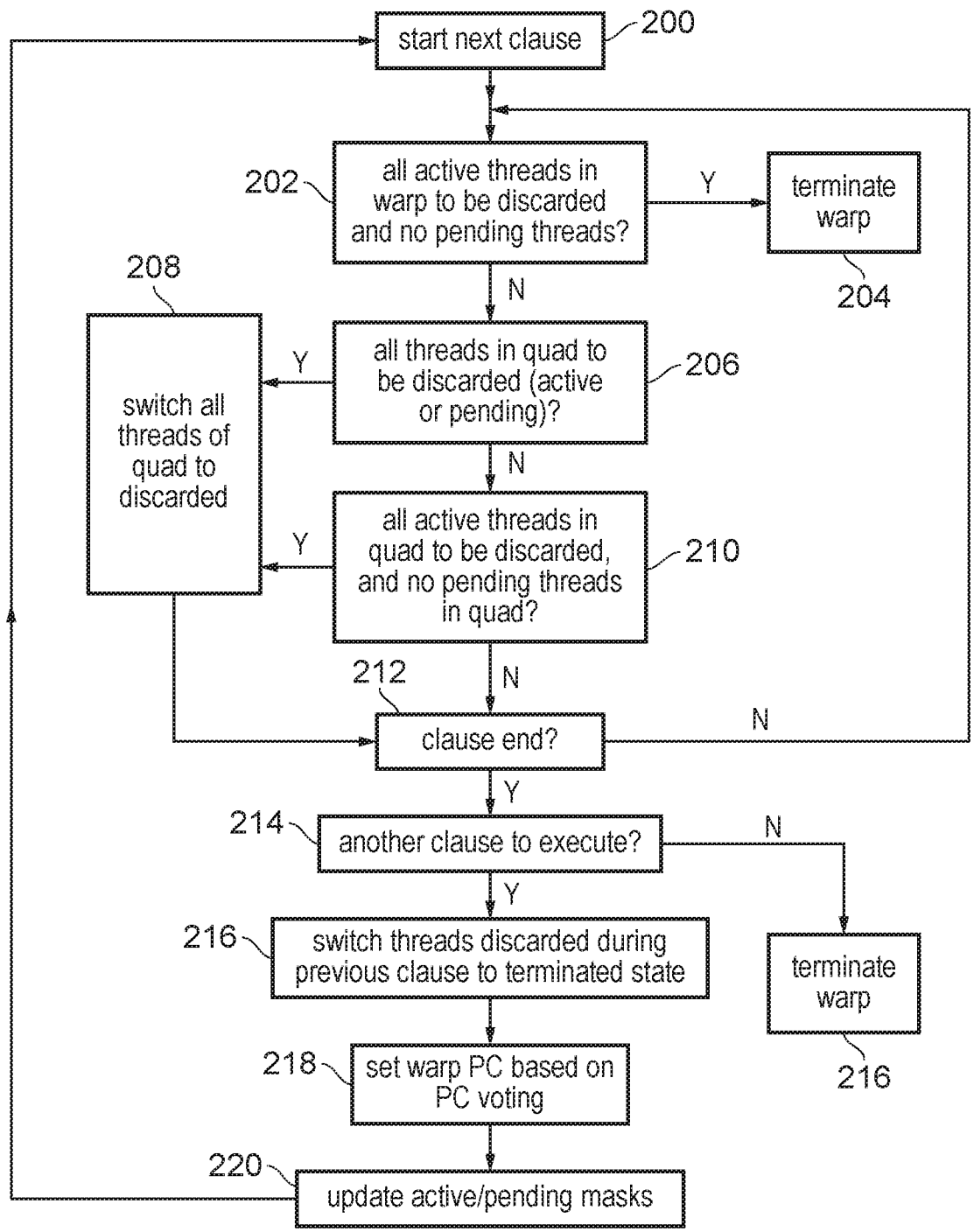

FIG. 6 schematically illustrates an example of one warp processing unit of the shader core;

FIG. 7 illustrates an example of execution of multiple threads in a warp controlled by a warp program counter in the warp processing unit;

FIGS. 8 and 9 show two examples of divergence between threads of the same warp;

FIG. 10 shows an example of clause execution by the warp processing unit;

FIG. 11 shows an example of different thread states for threads processed by the warp processing unit; and FIG. 12 is a flow diagram showing a method of controlling the thread state depending on whether threads need to be discarded.

Sometimes, having started processing a number of threads in a warp on the warp processing unit, it may be determined that some of the threads can be discarded, for example because the corresponding graphics fragments may not contribute to the final rendered image. When only some of the threads of the warp are to be discarded and other threads are to continue with their processing, then due to the reliance on the common warp program counter to control instruction fetching, it is not possible to allocate different threads to the parts of the warp processing unit which were previously processing the discarded threads. Hence, in general warp execution may continue. While some implementations may be able to suppress execution of instructions for parts of the warp processing unit which correspond to discarded threads, it may not always be practical to do this right away, if this functionality is provided at all.

The present technique provides a discarded state for thread processed by the warp processing unit, which can be used for a subset of threads to be discarded when at least one other subset of threads in the warp is to continue. When a thread is processed in the discarded state, execution of instructions for the discarded thread may continue, but at least one of the following actions may be performed. In one possibility, the warp processing unit may suppress generation of data access messages triggered by the discarded thread. Those data access messages may comprise messages which request access to data other than architectural state data stored in registers of the warp processing unit. Hence, even if instruction execution continues for the discarded threads, by suppressing generation of the data access messages, bandwidth in accessing storage units storing that non-architectural data can be saved for other operations or threads and the power incurred in unnecessarily accessing that other data can be conserved. In another option, for a thread processing the discarded state the graphics processing apparatus may enable at least one processing operation, which would be deferred until completion of the discarded thread had the threads not been discarded, to be commenced independently of an outcome of the discarded thread. Hence, even though execution of the instructions for the discarded thread continues, a subsequent operation which would ordinarily need to wait until the discarded thread had completed can be started without waiting for completion of the discarded thread, to improve performance for those other operations. In some implementations, only one of the options to suppress generation of messages or enable commencement of other processing operations could be implemented. Other implementations may provide both of these enhancements for the discarded thread. Hence, in general even if it is not possible to suppress execution of the instructions themselves for the discarded thread, there are still performance improvements and/or power savings which can be achieved by suppressing effects which the thread might otherwise have had on operations being performed outside the warp processing unit. This can lead to a performance improvement for the graphics processing apparatus as a whole.

Some implementations may allow threads to be placed in the discarded state at any granularity, for example permitting each individual thread to be individually placed in the discarded state or switched out of the discarded state.

However, in practice the overhead associated with individually discarding threads may not be justified. In some cases the threads processed by the warp processing unit using the shared warp program counter may comprise at least two groups of threads. The warp processing unit may prevent switching of a thread in a given group from a non-discarded state to the discarded state partway through execution of that thread, when at least one other thread of the given group is continuing in a non-discarded state. Hence, switching of threads to the discarded state could be controlled per group of threads, rather than per individual thread.

The groups of threads could vary in size. However, one particularly useful implementation may be where each group of threads comprises four threads which correspond to a 2 by 2 quad of graphics fragments (that is, four fragments corresponding to a block of pixels 2 pixels high and 2 pixels wide). It is common for graphics fragments to be grouped together in quads in order to allow differences between values associated with the graphics fragments in the same quad to be calculated, in order to calculate derivatives which may be useful for controlling rendering of gradients for example. Hence, in practice even if one thread corresponding to a given quad needs to be discarded, it may not be worth discarding that thread unless all the other active threads in the same quad also need to be discarded, because if the other threads in the same quad are still active then they may rely on values provided from the related threads in the same quad. Hence, in some cases each group of threads comprises a quad of threads.

In one example, in response to a determination that all the threads for a given group are to be discarded while threads of at least one other group processed by the same warp processing unit are to continue, the warp processing unit may switch the threads of the given group from the non-discarded state to the discarded state.

However, sometimes the warp processing unit may also switch threads to the discarded state even if not all the threads of the group are to be discarded. For example, sometimes it may have been determined right from the outset that a certain thread in a quad is not needed and so the warp processing unit could have been initialised with certain threads inactive from the start. In that case, it is not necessary for those threads which were always inactive to be discarded in order to justify discarding of the other active threads.

The warp processing unit may maintain an active mask indicative of which of the threads are active threads which are to execute the next instruction fetch in dependence of the warp program counter. The warp processing unit may also maintain a pending mask which indicates which threads were previously active but are now inactive due to divergence between the control flow taken by respective threads of the warp. The pending mask can be used to distinguish threads which were inactive right from the start of processing of the warp, and threads which became inactive because of divergence in control flow taken by respective threads.

Hence, in some cases if it is determined that all the active threads for a given group (e.g. quad) are to be discarded, the pending mask indicates that there are no pending threads for the given group, and threads of at least one other group are to continue, then the warp processing unit may switch all the active threads of the given group from the non-discarded state to the discarded state. This enables the discarded state to be used even when some of the threads were inactive right from the start of processing the warp.

The technique discussed above can be particularly useful in cases where the warp processing unit is responsive to clauses of instructions within a common program executed for the thread to the warp, so that each clause of instructions is executed as a block of instructions with sequential control flow. The warp processing unit may restrict non-sequential changes of control flow to the boundaries between clauses. This approach can be useful for reducing the overhead in determining control flow for the warp, because it means that comparisons of individual thread program counters in order to determine the next warp program counter to be used can be restricted to the boundaries between clauses rather than being performed after every instruction. In practice, for many graphics processing routines, the size of basic blocks between successive conditional branches can be relatively large so that significant power saving can be achieved by using clauses, where once a clause is entered then instructions are executed sequentially until the end of the clause and it is not possible to branch to a non-sequential instruction during the middle of a clause.

When the warp processing unit supports such clause-based execution, the warp processing unit may be incapable of updating an active mask partway through processing of a given clause, where the active mask as discussed above indicates which of the threads are active threads which are to execute the next instruction fetched in dependence on the warp program counter. That is, as program flow proceeds sequentially within each clause, conditional branch instructions would be placed at the clause boundary, and so within a clause there would be no change in the grouping of the threads as it is not possible for threads to diverge from one another within a clause. Therefore, overhead can be saved by avoiding updates to the active mask which indicates the current grouping of converging threads at the midpoint of the clause. As the active mask cannot be updated partway through a clause, then this also means that it may not be possible for instruction execution itself to be suppressed partway through a clause, even if it is determined partway through the clause that the thread needs to be discarded. In such an implementation, the technique of providing the discarded state as discussed above, which enables instruction execution to continue, but with certain effects of the thread on other threads being suppressed, can be particularly useful. As some clauses may be relatively long, in the absence of such a discarded state the discarded thread may continue to generate messages which lead to accesses to memory or to buffers outside the warp processing unit for some time after the thread has already been determined not to be needed, which would waste power and may impact on performance of other threads. Similarly, in cases where a discarded thread can allow a subsequent dependent operation to proceed, this enables performance improvement for such dependent operations. Hence, by switching a thread from a non-discarded (active) state to the discarded state partway through processing the given clause, performance can be improved.

When a given thread is switched from the non-discarded state to the discarded state partway through processing of the given clause, then once the processing of the given clause has completed, the warp processing unit may then switch the given thread to a terminated state. For threads in the terminated state, the warp processing unit may suppress execution of instruction. For example, the switching of the thread to the terminated state may correspond to clearing of bits in the active mask so that instructions will not be executed for that thread by the warp processing unit in subsequent clauses. Hence, the discarded state can be used between the point which the thread was determined to be discarded and the end of the current clause, which in some shader programs could be a relatively long time.

The discarded state can be used in cases where threads of a given group or quad are determined to be discarded, but at least one other group or quad still needs to continue. On the other hand, in cases where all of the threads processed by the warp processing unit are to be discarded (including all groups or quads), then the warp processing unit may simply terminate processing of the threads of the warp partway through the processing of a current clause. In this case it would not be necessary to wait until the end of the clause, because there are no threads for which instructions still need to be executed.

The discarded state can also be used for some threads other than those which are determined to need discarding after the warp has already started processing them. For example, a helper thread may be processed in the discarded state right from the start of processing the helper thread. Sometimes, the warp processing unit may be allocated to process certain helper threads of processing which do not actually correspond to a real graphics fragment which will end up contributing to the display of the rendered image frame, but which are instead processed in order to provide data values which may be used by other threads which do correspond to real graphics fragments. For example, such helper threads may be used in cases when a rasteriser maps a graphics primitive to a number of graphics fragments but the boundary of the primitive passes through a particular quad so that at least some of the fragments for the quad on the primitive boundary lie outside the primitive boundary and so do not need to be drawn. Nevertheless, in order to enable calculation of derivatives for those threads which correspond to fragments inside the primitive boundary, helper threads may still be issued for those fragments of the quad which are outside the primitive boundary. Those helper threads may be run in the discarded state from the start of processing of the helper thread, so that the helper thread does not generate messages or other threads at the same pixel position can be issued without waiting for the helper thread to complete.

There may be a number of reasons why the warp processing unit may determine that a given thread is to be discarded. In one example, the warp processing unit may determine that a thread is to be discarded in response to a kill signal indicating that the graphics fragment would be obscured in the rendered image by another graphics fragment processed by the apparatus. For example, the kill signal may be received from a forward pixel kill stage which is earlier in the graphics processing pipeline than the warp processing unit, and the kill signal may be generated in cases where the forward kill stage has determined that a later received fragment will obscure the earlier received fragment which is currently being processed by the given thread of the warp processing unit. By suppressing unnecessary processing operations for hidden fragments which would not contribute to the rendered image, the computational workload of the graphics processing pipeline as a whole can be reduced and so performance improved.

Also, in some cases a thread of processing being performed by the warp processing unit may itself determine that it needs to be discarded. For example, sometimes based on the depth value for a given thread, it may be determined that a certain part of the thread corresponds to an entirely transparent pixel and so in that case that fragment could be discarded. Hence, sometimes the shader program being executed for each of threads of the warp may have certain conditional functions which if executed may contain a discard instruction which instructs that the corresponding thread should be discarded. Hence, when the warp processing unit encounters a discard instruction within an active thread then it may determine that the corresponding thread should be discarded. Depending on whether the other threads of the same quad or group are also to be discarded the warp processing unit may determine whether to place the discarded thread in the discarded state.

The data access messages which are suppressed in some examples for threads in the discarded state may comprise requests to load data from or store data to a storage location outside the warp processing unit. For example, the storage location could comprise a tile buffer or a frame buffer which stores previously calculated pixel values for at least a portion of a rendered image frame, a depth buffer to store depth values for pixels of at least a portion of the rendered image frame, a texture buffer which stores texture data which is referenced in threads of processing performed by the warp processing unit, and/or an attribute data store for storing attributes calculated for a given graphics fragment prior to issuing a corresponding thread of processing to the warp processing unit. For example those attributes could specify parameters such as pixel position, colour, depth, transparency or opacity, etc.

In examples which allow at least one other processing operation to proceed without waiting for the outcome of a discarded thread, that other operation may be any operations performed within the graphics processing apparatus which depends on a result of the discarded thread or is blocked from proceeding until the discarded thread completes. In some cases, the at least one processing operation may comprise another thread of processing which is performed for another graphics fragment which corresponds to the same position in the rendered image as the graphics fragment for the thread in the discarded state. For example, to ensure that subsequent operations such as alpha blending or depth testing consider each respective fragment for the same pixel position in turn, the scheduler which allocates threads of processing to the warp processing unit or to other warp processing units within a shader core may defer issuing threads for a given pixel position until any previous thread for the same position has already been completed. When a thread is in the discarded state it is not necessary to wait for completion of that thread and instead the other thread of processing for a different graphics fragment at the same position can then be issued for execution. In particular in cases where the handling of discarding of threads is done per group or quad as discussed above, then this can allow a different quad for the same pixel position to be issued for thread processing earlier.

While some implementations could provide a single warp processing unit, in some cases the apparatus may comprise two or more separate warp processing units which each have a separate warp program counter. Hence, threads processed within the same warp share a common warp program counter and so fetching and decoding of instructions is shared between the respective threads of the warp, but the threads in one warp processing unit may be executed independently of the threads in another warp processing unit, with different warp program counters controlling the fetching and decoding of different instructions in parallel for the respective warps.

Figure 1:
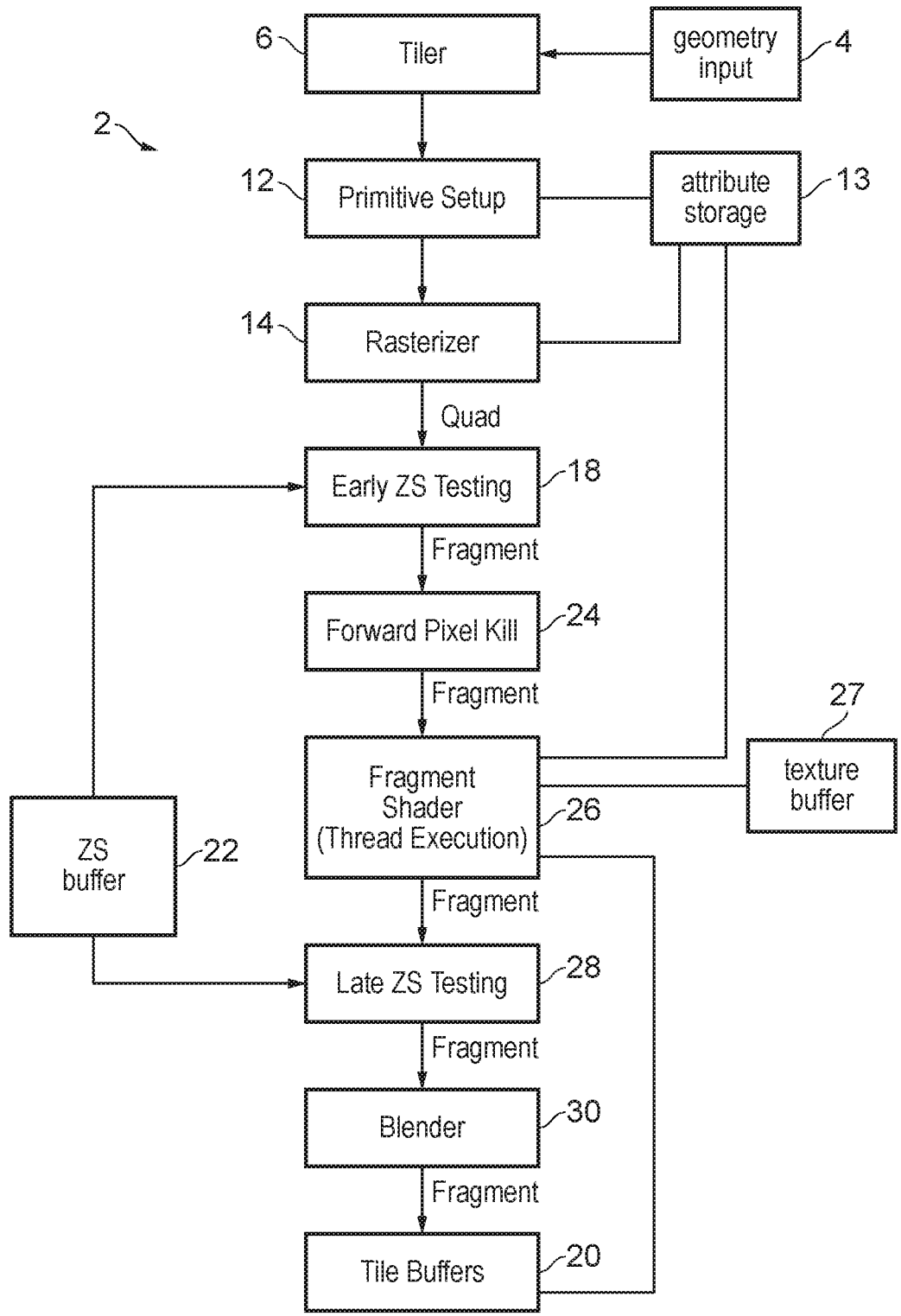

FIG. 1 illustrates an example of a graphics processing pipeline 2 for processing graphics primitives for display of a frame of image data. Geometry data 4 defining a number of graphics primitives to be drawn in the rendered image is input to the pipeline. The primitives may correspond to triangles or other polygons to be drawn, for example. The geometry input may specify coordinates of the vertices of each primitive, and could also specify other properties of the primitive, such as a colour, transparency or depth associated with a given vertex.

Figure 2:
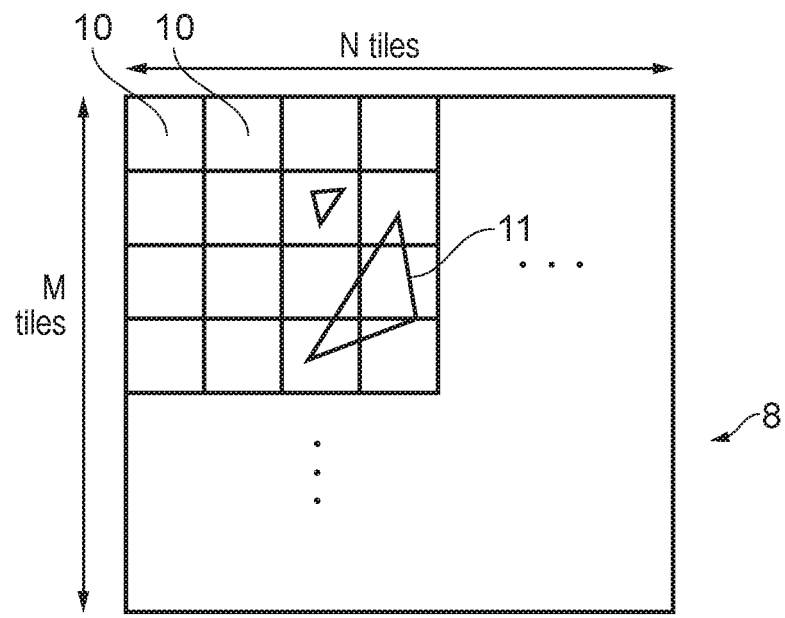
FIG. 2 shows an example of tiled rendering of graphics primitives.

A tiler stage 6 receives the geometry input and allocates each primitive to one or more tiles within the frame to be rendered. As shown in FIG. 2, the frame 8 may be divided into a grid of smaller tiles 10 of a certain size (e.g. 16×16 pixels or 32×32 pixels). Some primitives 11 may span more than one tile, and so may be allocated to more than one tile by the tiler 6. It is not essential for the tiles to be square, and in some examples rectangular tiles could be used. The remaining stages of the pipeline 2 use tile-based rendering, in which the operations for drawing the pixels in a given tile are completed before moving to the next tile of the image. Hence, the tiler 6 iterates through each successive tile of the frame 8, for each tile sending information on the set of primitives to be drawn in that tile to the primitive setup stage 12, and moving to the next tile once all the primitives of the previous tile have been sent, and continues iterating until all of the tiles in the frame are complete, at which point the geometry input 4 for a subsequent frame can be received and processed.

The primitive setup stage 12 performs various primitive setup operations on the group of primitives assigned to a given tile. For example, the primitive setup operations may identify additional properties of the primitive which are not explicitly indicated by the geometry data. For example, the primitive setup stage 12 may derive one or more edge functions which represent the positions of edges linking the respective vertices of the primitives, a depth function which represents the variation in depth across the primitive, or an interpolation function that represents the variation of attributes such as colour, shading, or transparency/opacity values across the primitive. The attributes determined by the primitive setup storage stage 12 may be stored in attribute storage 13.

Figure 3:
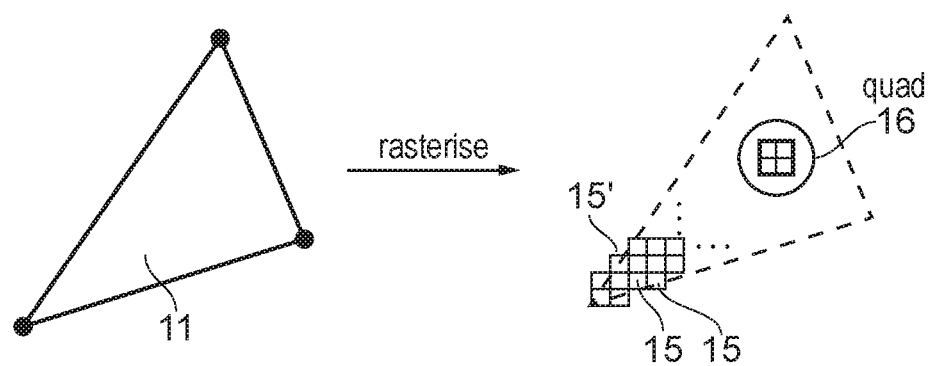
FIG. 3 shows an example of rasterising to generate graphics fragments corresponding to the graphics primitives.

As shown in FIG. 3, the primitives 11 are passed to a rasterizer stage 14 which converts the vertices and any additional primitive setup intimation for a given primitive into graphics fragments 15 representing properties (x-y position, depth, colour, transparency/opacity, etc.) of corresponding pixels of the area occupied by the primitive. In the embodiment discussed below, the fragments generated by the rasterizer 14 are processed by some downstream stages (e.g. the shader stage 26) in units of 2×2 blocks of pixels called quads 16 (with processing performed for each fragment in the same quad in parallel). However, this is not essential and other implementations could process each fragment individually, or in groups of a different number of fragments. If a quad crosses a primitive boundary, then in addition to conventional threads of processing performed for fragments inside the boundary, the pipeline may also perform helper threads for fragment positions 15' outside the boundary which will not end up being drawn, but are used to assist with calculations of other fragments of the same quad which do lie inside the primitive boundary.

Figure 4:
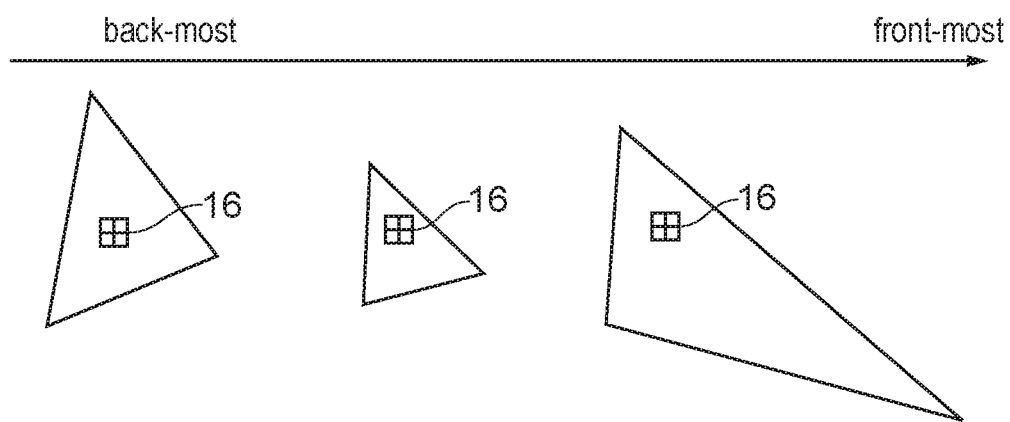
FIG. 4 illustrates an example where a thread of processing for a particular graphics fragment may be discarded because the graphics fragment does not contribute to the final displayed frame because it is obscured by another graphics fragment.

As shown in FIG. 4, different primitives associated with different depth values may include opaque fragments 15 or quads 16 at the same x-y position, so that only the front-most fragment or quad is visible in the final image. The fragments generated by the rasterizer 14 are subject to an early depth testing stage 18 which tests whether the depth associated with a later received fragment is such that the later fragment would be obscured by an earlier fragment which has already been drawn to tile buffers 20 for storing the latest values of pixels of the scene for which rendering is in progress. The tile buffers 20 may comprise one buffer per tile, and each tile may comprise a number of entries each corresponding to one pixel of that tile. The pipeline may maintain a Z stencil buffer 22 which stores, on a per pixel basis, a depth value Z which indicates the depth of the front-most fragment rendered at a given pixel position so far in the current tile. Hence, the early depth testing stage 18 may compare the depth associated with a latest received fragment with the depth indicated for a corresponding pixel coordinate in the Z stencil buffer 22, and suppress processing of the received fragment when it is determined that the depth position of the later received fragment is behind the depth position of the already drawn fragment whose depth is represented in the Z stencil buffer 22.

The early depth testing stage 18 helps eliminate processing of fragments in cases where the front-most fragment at a given pixel position is received before the back-most fragment, and so the later received fragment can have its processing suppressed because it will be hidden by an already drawn fragment. However, it is also possible that the back-most fragment may be received before the front-most fragment. Hence, fragments which pass the early depth testing stage 18 are provided to a forward pixel kill (FPK) stage 24 which identifies cases when an earlier received fragment would be obscured by a later received fragment. On receipt of a given fragment (a later received fragment), the FPK stage 24 tests whether an earlier received fragment still pending in the FPK stage 24 or a later stage of the pipeline 2 would be obscured by the given later received fragment. If so, the FPK stage 24 generates a kill request to request that further processing of the earlier received fragment is suppressed, to avoid expending further processing resource on processing of a fragment which would not contribute to the final image.

Fragments which are not killed by the FPK stage 24 are passed to a fragment shader stage 26 which comprises thread processing circuitry for performing threads of fragment shader processing for each fragment. For example the fragment shader may access texture data stored in a texture buffer 27, which defines functions representing a pattern or texture to be rendered within a given primitive and may use this to determine the precise colour to assign to a given pixel (colours initially assigned by the primitive setup and rasteriser stages 12, 14 may be initial values for the shader threads). The fragment shader stage may execute a number of threads of processing corresponding to the respective fragments of the same quad 16 in parallel. The fragment shader core may also have resources for processing multiple quads 16 in parallel. Fragment shader execution is relatively processor-intensive, which is why it can be useful for the FPK stage 24 to be able to suppress a target thread of fragment shader execution if it is found that a later received fragment will obscure the earlier fragment corresponding to the target thread. The fragment shader core 26 is described in more detail below.

The shaded fragments are provided to a late depth testing stage 28 which tests whether the depth associated with the shaded fragment is such that the fragment will be obscured by an already rendered fragment as indicated by the depth in the Z stencil buffer 22. The late depth testing stage 28 is provided because there are some fragments for which the depth value may not be available in time for the early depth testing stage 18, or for which the depth may change during the fragment shader execution. Late depth testing also enables detection of overdrawn fragments in cases where, at the time the later fragment is at the early depth testing stage 18, the earlier fragment which would obscure that later fragment is still pending in the pipeline and has not yet updated the Z stencil buffer 22 (but will do so by the time the later fragment reaches the late depth testing stage 28). Also, the late depth testing stage 28 enables handling of transparent objects whose transparency may only become apparent during the fragment shader execution. If any fragments are found by the late depth testing stage 28 to be obscured by already drawn fragments, they are suppressed and prevented from being drawn to the corresponding tile. Remaining fragments are passed to a blending stage 30 which performs blending to blend properties of transparent fragments with the next front-most fragments at corresponding pixel positions, and writes the resulting pixel values to corresponding entries of a currently active tile buffer. For opaque objects, the blending stage 30 may simply overwrite previous pixel values in the tile buffer. When processing of all fragments for a tile is complete, processing moves to the next tile represented by a different tile buffer.

While FIG. 1 shows an example using tile-based rendering, which can be advantageous in order to reduce cache capacity and memory bandwidth required, other examples may use immediate mode rendering, in which the primitives for the entire frame are passed down the pipeline in any order, without first grouping them together into tiles. While FIG. 1 shows various buffers 13, 22, 27, 20 implemented as storage units in the pipeline 2, in practice these may be implemented as storage structures accessed from memory by general purpose load/store instructions. Entries of the buffer storage structures may be cached local to the pipeline 2. Using tile-based rendering can help improve caching efficiency as grouping the processing of pixels of a given tile together increases the likelihood that required buffer data is present in the cache, as it is more likely that nearby pixels will need similar data.

Figure 5:
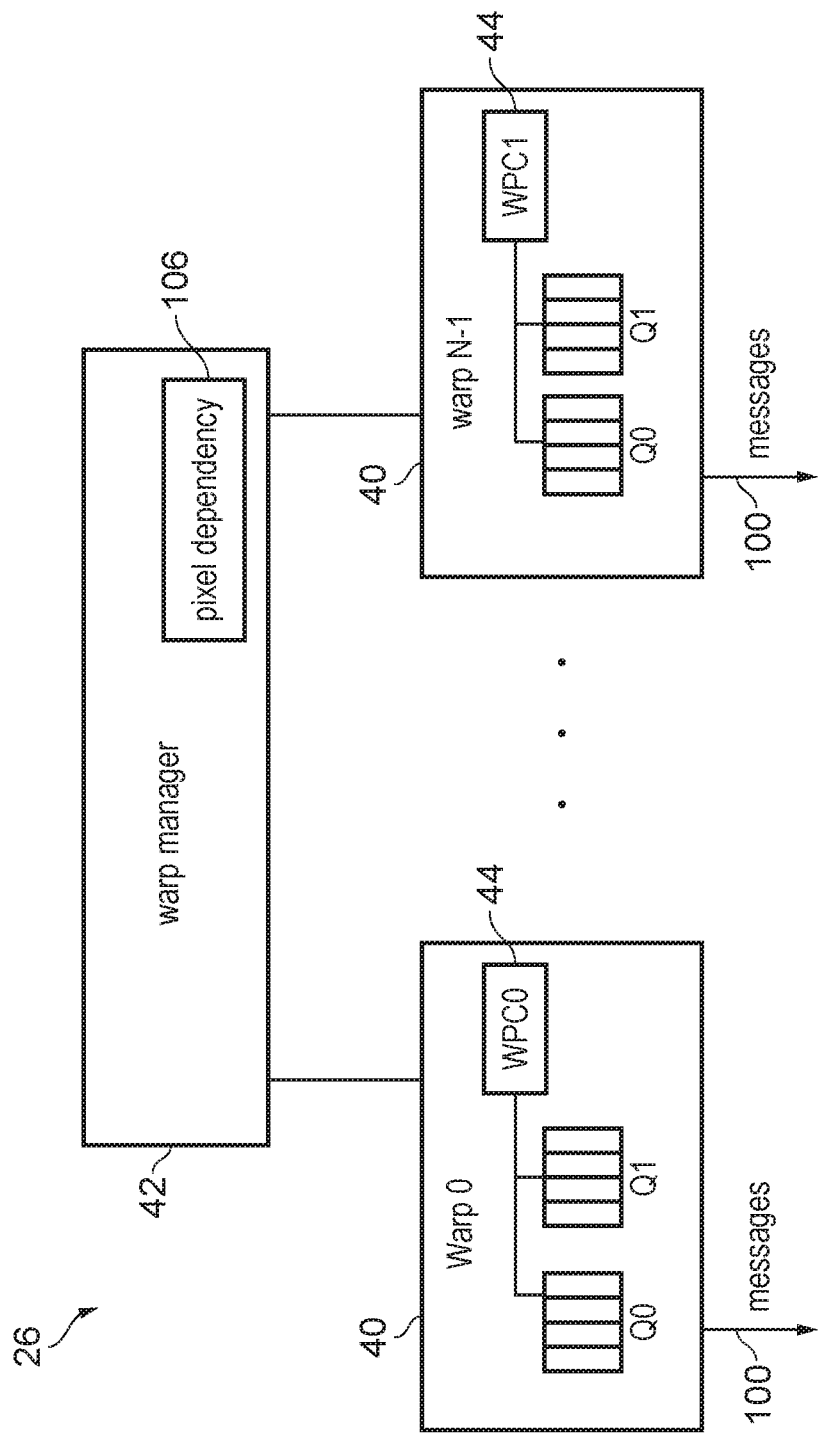
FIG. 5 illustrates an example of a portion of a shader core for performing threads of shader processing, the shader core comprising at least one warp processing unit.

The fragment shading stage 26 includes one or more shader cores which perform threads of fragment shader execution. FIG. 5 shows a portion of one shader core. It will be appreciated that FIG. 5 is greatly simplified and in practice the shader core may have many other elements not shown in FIG. 5. Each shader core may include a number of warp processing units 40 and a warp manager 42. Each warp processing unit 40 may process a number of threads of fragment shader execution as a warp under control of a shared warp program counter 44. In the example of FIG. 5, each warp processing unit 40 processes eight threads, corresponding to two quads 16, but other examples could process a greater number of quads within the same warp. Within a warp 40, the threads are processed according to a single instruction, multiple thread (SIMT) model in which execution of a common program by a number of threads acting on different data inputs is controlled based on a single shared warp program counter 44. The warp manager 42 controls scheduling of particular quads' threads on the respective warp processing units 40.

FIG. 6 shows an example of one warp processing unit 40 in more detail. The warp processing unit 40 includes a number of execution pipelines 50, one for each thread of the warp. Hence, in this example as two quads are processed by the warp there are eight execution pipelines 50. Each execution pipeline 50 has access to a corresponding set of threads state 52 stored in architectural state registers 54. Each execution pipeline 50 executes instructions from a common shader program, but using different data inputs as defined by the thread state 52. Common instruction fetch/decode logic 56 is provided and shared between the respective execution units 50 of the warp, so that in each cycle the same instruction is issued for execution in parallel on at least a subset of the thread execution pipelines 50 (hence it is not possible for different instructions to be issued to the execution pipeline 50 of the same warp 76 in the same cycle). The warp program counter 44 represents the instruction address of the current point of execution in the common program reached by the warp as a whole, and control the fetching logic 56 to fetch the instruction indicated by the warp program counter 44. Each thread state includes a corresponding thread program counter 58 which represents the next instruction to be executed by the corresponding execution unit 50 for the corresponding thread. Each thread program counter 58 is incremented (or updated non-consecutively in the event of a branch) based on the outcome of processing of the corresponding thread. Program counter voting logic 72 is provided to select, based on the individual thread program counters 58 for each thread of the warp, which value to set to the global warp program counter 44 which controls which instruction is fetched in the next cycle.

This type of processing may be referred to as single instruction multiple thread (SIMT) processing. As the respective pixels in one quad are likely to have similar input values they are likely to take similar paths through the thread shader program, and so it can be efficient to control execution of the corresponding threads using SIMT to reduce the instruction fetch/decode overhead. Similarly, nearby quads are more likely to take similar paths than quads further apart, so by scheduling the threads for nearby quads on the same warp, processing efficiency can be improved.

FIG. 7 shows an example of execution of a simple sequence of instructions using SIMT processing for a warp comprising 4 threads. 4 threads are shown for conciseness, but it will be appreciated that other numbers of threads (e.g. 8 in the example of FIG. 6) could also be processed in a SIMT manner. A common sequence of instructions is executed in lockstep by each thread of the warp (thread group). The warp program counter 44 indicates the address of the current instruction being processed by the warp as a whole. The warp program counter 44 is derived from the thread program counters 58 (tPC0-tPC3) of the individual threads in the warp (for example by program counter voting). For example, the warp program counter 44 may correspond to the lowest address indicated by any of the thread program counters 58 for the group of threads processed in the warp. For each thread within the group, the instruction indicated by the warp program counter 44 is executed in the current processing cycle if the thread program counter 58 for that thread matches the warp program counter 44. If the thread program counter 58 for a given thread does not match the warp program counter 44, the corresponding warp execution unit 50 is idle for a cycle (although it will be appreciated that execution of instructions by each warp execution unit 50 may be pipelined so when part of an execution unit 50 is idle other stages may still be carrying out operations relating to an instruction issued in an earlier or later cycle).

Hence, in the example of FIG. 7:

In cycle 0, the warp program counter 44 indicates address #add, and all the thread program counters 58 for threads 0 to 3 also indicate address #add. Therefore, all the threads execute the ADD instruction at address #add. Different threads may execute the ADD instruction using different operands so that a number of different additions are performed in parallel for the respective threads.

In cycle 1, a compare instruction CMP at address #add+4 is executed to compare the result r2 of the ADD instruction with an immediate value 19. For threads 0, 1 and 3, the result r2 was not equal to 19, while for thread 2 the result r2 was equal to 19.

In cycle 2, a branch instruction BNE branches to address #add+16 if the outcome of the CMP instruction in cycle 1 was not equal (NE). For threads 0, 1 and 3, the branch is taken and so the thread program counters 58 for these threads are set to #add+16. However, for thread 2 the outcome of the CMP instruction was equal (EQ), and so the branch is not taken and the thread program counter 58 for thread 2 is incremented to #add+12. Hence, now there are threads with different values of the thread program counter 58, and there is different behaviour between the threads.

In cycle 3, the warp program counter 44 is set to #add+12 to match the lowest of the thread program counters 58 (in this case, the thread program counter for thread 2). For thread 2, the multiply instruction MUL at address #add+12 is executed. However, no instruction is executed in cycle 3 for threads 0, 1 and 3 because the thread program counters 58 for these threads do not match the warp program counter 44. These threads wait until the warp program counter 58 reaches #add+16 before resuming instruction execution.

In cycle 4, the warp program counter 44 is incremented to #add+16, and so now the threads 0 to 3 re-converge and execute the store instruction STR at address #add+16 to store a value to a memory address determined based on a base address and index, with different threads using different indices for determining the target address. The memory accesses for at least some of the threads can be coalesced into a single memory access if the indices are such that the accesses target the same region of memory (e.g. the same cache line, or the same page of the address space).

Hence, in the example of FIG. 7, as the threads require the same instructions to be executed on different data values, they can be processed efficiently as a group, because this allows a single instruction fetch to be amortized across the group of threads and memory accesses to be coalesced. However, branch instructions, for example, may cause different behaviour, such as when thread 2 required a different instruction to the other threads. While in FIG. 7 this led to only a single cycle bubble in the pipelines for threads 0, 1 and 3, in other cases the divergence could last longer. There may be events other than branches which cause similar differences in behaviour. When threads in a warp diverge, there may be a significant number of cycles in which threads cannot execute their next operation because they must wait while other threads execute different operations, and this reduces efficiency. Hence, the efficiency of the processing may depend on how the threads are grouped together. In practice, by allocating the threads for fragments in the same quad (2×2 pixel block) to the same warp, the likelihood of the threads in the warp diverging can be reduced.

As shown in FIG. 6, the warp processing unit 40 may maintain an active mask 60 and a pending mask 62 for tracking the convergence or divergence between the paths taken by the respective threads of the warp. Use of the active mask 60 and pending mask 62 is shown in more detail in FIG. 8. The active mask 60 comprises a number of bit flags 64 each corresponding to one thread, indicating whether the corresponding thread is active. Similarly, the pending mask 62 includes per-thread bit flags 66 indicating whether the corresponding thread is pending (a pending thread is a pending thread that has become inactive due to divergence with other active threads). Initially, when starting execution of the shader program, all eight threads Q0T0 to Q1T3 are active and so all bits 64 of the active mask 60 are equal to 1 and all bits 66 of the pending mask 62 are equal to 0. At a given point in the shader program, a conditional branch instruction is reached and the outcomes of the instruction are different for different threads so that there is divergence in the control flow. Two of the threads Q0T0 and Q1T1 take a first path 68 through the program and so when the pipelines are executing instructions from this branch then the active mask has '1' bits corresponding to these two threads, and '0' bits corresponding to the other threads, and the pending mask 62 has the opposite value to the active mask, since all the remaining threads are pending and awaiting the warp program counter 44 to come back to an address of an instruction which needs to be executed by those threads. On the other hand, in a second branch of the program the remaining threads are active and threads Q0T0 and Q1T2 are inactive, as indicated by the active and pending masks respectively. As shown in the example of FIG. 8, if the threads later then converge again then the active mask may return to being all 1 s and the pending mask return to being all 1 s.

In cases where all the threads were originally active and none of the threads have yet been terminated then all threads may have a bit set in either the active mask 60 or the pending mask 62, so that a bitwise OR of the active and pending mask together will always produce a result having all bits set to 1. However, as shown in FIG. 9 this is not essential, and sometimes the warp manager 42 may allocate threads to a given warp such that at least one thread is inactive right from the outset of processing the warp and in this case at least one bit of the active mask 60 may start at 0 even when there are no threads pending. Hence, in the example of FIG. 9 if there is divergence then again those threads which are active in a given branch 68, 70 of the control flow have their active mask bits set to 1 while the other threads which were previously active but have been suspended due to the divergence have their bits in the pending mask set to 1. Threads which were never active because they were inactive from the start will have the corresponding bits 64, 66 set to 0 in both the active and pending masks 60, 62. Similarly, if execution of a thread is terminated then both the active and pending masks may be set to 0 for a given thread.

As shown in FIG. 6, the active mask 60 and the pending mask 62 may be set as a result of the program counter voting performed by program counter voting logic 72 based on the individual thread program counters 58 of each thread of the warp. Once the new value for the warp program counter 44 has been determined, the program counter voting logic 72 may set the bits in the active mask 60 to 1 for any previously active or pending threads which have a thread program counter 58 which matches the warp program counter 44, and may set the bits in the pending mask 62 to 1 for any previously active or pending threads for which the respective thread program counters 58 does not match the newly determined warp program counter value 44.

FIG. 10 shows an example of clause-based execution which may be performed by the warp processing unit 40. The program counter voting operation may be relatively expensive in terms of power consumption in that multiple thread program counters 58 may need to be compared in order to identify the value to be set to the warp program counter 44. In practice, large chunks of program execution within a shader program may be performed sequentially without any conditional branch instructions, and so in those cases the warp program counter 44 can simply be incremented from cycle to cycle because there is no risk of threads converging or diverging during those sequential sequences of program instructions. In this regard, sequential instructions are instructions which are stored at sequential (contiguous and consecutive) memory addresses which follow some predetermined stride interval.

To avoid needing to invoke the program counter voting logic 72 after every instruction, instructions may be grouped by a programmer or compiler into clauses 80 as shown in FIG. 10. Each clause may be marked in some way within the program code, e.g. by preceding the instructions of a given clause with a clause header 82. It will be appreciated that in other examples clauses could be partitioned instead by a clause footer which follows the corresponding clause, or with both a clause header and a clause footer, or by some other techniques such as annotating the first instruction of the clause in some way or by using a predetermined type of instruction (e.g. a branch) to mark the boundary between clauses. As shown in FIG. 10, the length of each clause may vary depending on the locations of the branches within the program being executed and the program may include any number of clauses. Regardless of the way in which the clause boundaries are identified in the program code being fetched by the instruction fetch logic 56, by breaking the instruction execution into clauses in this way, the programmer or compiler can choose the locations of clause boundaries so that they correspond to the branch instructions which may lead to non-sequential changes of program flow, so that within a clause execution of instructions can proceed entirely sequentially. This means that the program counter voting logic 72 only needs to be invoked at the end of a clause before determining the warp program counter to be used for the next clause. Within a clause, the warp program counter 44 can instead simply be incremented by an adder 86 based on some fixed stride value corresponding to the length of the instructions, which is much less energy intensive than the program counter voting operation. As program counter voting takes place at clause boundaries, this means that the active mask 60 and pending mask 62 may not be changed in the middle of a clause but may only be updated at the end of a clause before starting the next clause.

In some implementations, clause-based execution in this way may also allow other performance or energy saving optimisations to be made within the pipelines 50 or the access to the architectural state registers 54. For example, a clause may be seen as an atomic set of operations which are generally performed as a whole. Hence, at an intermediate point of the clause it may not be guaranteed that the thread state 52 within the architectural state registers 54 for a given thread is in a consistent state. For example, to save overhead in writing to the architectural state registers 54 and reading from the architectural state registers, where two instructions issued back to back within the same clause are such that the first instruction writes to a given register and the next instruction reads from the same register, and that register will then be overwritten by a subsequent instruction of the clause, then it may not be needed to perform the register write at all since the value to be read by the second instruction could simply be retained within the pipeline after execution of the first instruction as it will be forwarded directly to the inputs for the processing element performing the second instruction. By reducing the number of register reads and writes needed, this can improve performance and save energy. Hence, the correctness of the current architectural state stored in the registers may not be guaranteed partway through a clause.

As shown in FIG. 6, the warp processing unit may have logic 90 for determining whether any threads of processing being performed by the warp can be discarded. There may be a number of reasons why threads may be discarded. In some cases the pixel kill stage 24 of the pipeline 2 may determine that a thread already in progress within the fragment shader stage 26 would be overdrawn by a later received fragment which is following that earlier fragment through the pipeline, and in this case may issue the kill signal 92 which may be passed by the warp manager to the relevant warp processing unit 40 handling processing of that fragment thread. The discard logic 90 may compare pixel position coordinates specified by the kill signal 92 with coordinates specified in warp status information 94 which indicates the positions of the pixels corresponding to the fragments processed by each thread of the warp in order to determine whether that kill signal applies to the current warp and if so which thread.

Also, in some cases the shader program itself could include a discard instruction on a particular branch of the control flow, which if executed for a given thread leads to that thread being discarded as it is determined that that thread is no longer needed. Hence, if the instruction fetch and decode block 56 encounters such a discard instruction then this may be signalled to the discard logic 90 and, when combined with the active mask 60, this can identify which threads should be discarded (the pending threads indicated by the pending mask 62 would not be discarded since those would skip over the discard instruction as they are not currently active).

Regardless of the reason for the discarding of a given thread, the warp processing unit 40 may handle discarding of threads at the granularity of quads rather than on individual threads. Hence, either an entire quad of threads may be discarded or those threads may continue. This is because the threads of a given quad may have interdependencies where one thread of the quad refers to values calculated by another thread of the quad, as this can be useful for calculating derivative functions which are used for determining gradients to be rendered in the image. Hence, even if one thread in the quad needs to be discarded, if other threads in the quads are still not discarded then the quad as a whole may continue.

If all of the threads in the entire warp (that is, all of the quads) are to be discarded, then processing of the instructions from each of the threads can simply be terminated right away regardless of whether the end of a clause has been reached. This can free up the warp processing unit 40 for handling other quads sooner.

However, if only one quad (or two or more quads but less than all of the quads in cases where the warp processing unit processes more than two quads), is to be discarded then execution of instructions for the non-discarded quads should continue. As instruction execution for the warp as whole is controlled based on a common warp program counter 44, this means that it would not be possible to reallocate completely different quads to the warp until the continuing quads complete.

Hence, instead, when all the threads of a given quad are to be discarded but another quad continues, those threads can be marked as inactive by clearing the corresponding bits in both the active and pending masks 60 and 62. For example each execution pipeline 50 may include power gates which isolate portions of the pipeline from a power supply or clock supply so that they can be placed in a power saving state to save power when the corresponding threads have become inactive or have been terminated. However, due to the clause-based execution described with reference to FIG. 10, the active and pending mask 60, 62 may not be allowed to be changed partway through a clause and so when the discard logic 90 determines that all the threads of a given quad are to be discarded partway through a clause, the corresponding instructions may still need to be executed up to the end of the clause. As some clauses can be relatively long this may take some time and in the meantime the threads may have certain effects on parts of the graphics processing pipeline to outside the warp processing unit 40. For example, as shown in FIG. 5, each warp processing unit 40 may have a message passing interface 100 for passing messages to other elements of the pipeline or to memory, in order to access data required by a given thread of processing being performed on the warp 40 data (data other than the architectural state 52 of the thread which is stored in the architectural state registers 54 of the warp processing unit 40). For example the messages 100 may be load/store requests for performing load or store operations on data within the attribute storage 13, texture buffer 27, depth buffer 22, or tile buffers 20 shown in FIG. 1. The messages could also be general load/store operations performed to main memory. If, during the period between determining that the threads of a given quad need to be discarded and the time when the threads are actually suspended at the end of a clause, such messages 100 are triggered by instructions of the discarded threads, then this will lead to unnecessary load or store operations being triggered to data storage elements outside the warp processor. As well as unnecessarily expending power in reading or writing to those storage locations, this can also have a knock on effect on performance of other threads which may be waiting for bandwidth in the memory or the buffer being read.

Hence, in one example the warp processing unit 40 may support placing threads in a discarded state in which execution of the instructions still continues, but generation of the messages 100 which request access to data other than the architectural state of the warp processor are suppressed to save energy and improve performance of other threads. A discarded mask 102 may track which threads are in the discarded state, and respective bits of the discarded mask may be provided to the respective pipelines 50 to control whether they trigger generation of the messages 100. Once the end of the current clause is reached then any threads which have been placed in the discarded state within that clause can then be switched to the inactive state by clearing the corresponding active and pending mask bits 60, 62, so that for subsequent clauses power gating can be used to suppress the instruction execution and save more power. Nevertheless, in the period up the end of the clause in which the discarded threads were identified, use of the discarded mask and the message suppressing enables further power savings and performance improvements.

In another example, the warp manager 42 may have a pixel dependency tracker 106 which tracks the pixel positions of the quads/fragments currently being processed within each of the warp units 40. In some examples the pixel dependency tracker 106 could instead be implemented in a different part of the pipeline outside the warp manager 42. When a thread for a given pixel position is in flight within one of the warp processing units 40 then the warp manager 42 may prevent any further threads being allocated for another graphics fragment which corresponds to the same pixel position. This means that while threads are in flight, other threads may be held back until those threads for the same pixel position are complete. To speed up the processing of such other threads, when a quad is discarded and the corresponding threads are placed in the discarded state, those threads may be removed from the pixel dependency tracker 106 so that those threads are no longer indicated as in flight, and so any subsequent threads which process fragments at the same pixel position within the final image frame can then proceed and can be allocated to a given warp processing unit 40. Again this enables a performance improvement by allowing other quads to be processed sooner than they could have done if they had to wait for the warp to complete.

FIG. 11 provides a table summarising different states in which the threads of a given warp can be placed. In an inactive or terminated state both the active and pending mask bits 64, 66 may be 0 and a bit of the discard mask 102 may also be 0. The inactive state may be used in cases where a certain thread was allocated to the warp processing unit 40 in the inactive state, or in a case where a thread was previously active but was terminated, for example following discarding of the corresponding thread once the end of the clause in which the discarding was detected has been reached. When a thread is in the inactive or terminated state, the corresponding processing pipeline 50 may use power gating to suppress instruction execution and save energy.

In an active state, the active mask bit from thread 64 is 1, the corresponding pending mask bit 66 is 0 and the discard mask bit is 0 and in this case the instruction fetched and decoded by the fetch/decode block 56 is executed for the thread. In a pending state, the active mask bit 64 is 0, the pending mask bit 66 is 1 and the corresponding bit of the discard mask 102 is 0 and in this case while the thread remains pending and so may be made active again later depending on the program counter voting 72, execution of the instructions fetched by the instruction fetch/decode block 56 is suppressed for that thread, although the corresponding thread state is retained in the registers 54 ready for when the thread once more becomes active.

In the discarded state, the discard mask bit in the discard mask 102 for that thread is 1 and the active and pending mask bits 64, 66 may take any value. In this case instruction execution may continue in the same way as if the thread was active, since the active mask 60 cannot be changed partway through a clause. However the discard mask bit controls the relevant thread's pipeline 50 to either suppress generation of messages 100 for accessing data outside the warp processing unit 40, or to remove the thread from the pixel dependency tracker 106, or both. This enables energy savings and performance improvements even in cases where actual execution of the instructions of the thread cannot yet be suspended.

FIG. 12 is a flow diagram illustrating a method of processing threads on the warp processing unit 40. It will be appreciated that this shows the steps taken for a single warp processing unit 40 but other warp processing units 40 could be performing similar operations in parallel.

At step 200 the warp processing unit starts execution of instructions from the next clause of the program being executed. If no previous clauses have been executed then this is the first clause of the program. At step 202 the discard logic 90 determines whether all active threads in the entire warp are to be discarded and there an no pending threads. If so then at step 204 the entire warp is terminated and this frees the warp processing unit 40 for reallocation to other quads by the warp manager 42. The method then ends.

If there is at least one active thread in the warp which has not been discarded or there was at least one pending thread not discarded then at step 206 the discard logic 90 determines whether all threads in a given quad within the warp are to be discarded. These may include either active or pending threads. If all four threads of the same quad are to be discarded (and due to the NO determination at step 202 there is at least one other quad which is not discarded), then at step 208 all the threads of that quad are switched to the discarded state by setting the corresponding bits in the discard mask 102. This means that for the remainder of the clause those threads may not trigger generation of messages 100 and/or may be removed from the pixel dependency tracker 106.

On the other hand, if at step 206 it is determined that not all threads of the quad are to be discarded then at step 210 it is determined whether all active threads of the quad are to be discarded and there are no pending threads in that quad. For example this may be determined based on the active mask 60 and pending mask 62 such that all the threads with a 1 in the active mask are to be discarded and there are no '1' bits set for that quad in the pending mask 62. If this criteria is satisfied then again at step 208 all the threads of the quad are switched to the discarded state, or at least all active threads of the quad are switched to the discarded state (as the pending threads will no execute instructions in this clause, they cannot trigger message generation anyway).

At step 212 it is determined whether the clause end has yet been reached and if not then the method returns to step 202 to continue checking for discarding of threads. When the clause end has been reached, then at step 214 it is determined whether there are any more clauses to be executed. If there are no more clauses, then at step 216 the warp is terminated and the results of the warp are forwarded to the subsequent pipeline stages to performed late depth testing, alpha blending and so on.

If there is at least one more clause to be executed, then at step 216 any threads which were switched to the discarded state during execution of the recently finished clause are then switched to the terminated state, so that during the subsequent clause the instruction execution is suppressed to save more power. At step 218 the warp program counter 44 is determined by the program counter voting logic 72 based on the individual thread program counters 58, and at step 220 the active and pending masks 60, 62 are updated based on the result of the program counter voting, and then the method returns to step 200 to start the next clause.

In summary, when a quad is fully discarded the warp can be kept executing and the other quad is not discarded, and power can be saved and performance improved by terminating partially the warp and releasing back pixel dependencies. A quad is suppressed if all four threads of the quad are discarded or if all active threads of the quad are discarded and the threads are non diverging (i.e. there are no pending threads). If these conditions are met then for that quad we can suppress messages to save power, at the end of the clause set a mask to terminate the quad to save substantial power by power gating, and also remove the quad from the pixel dependency system rather than waiting for full warp completion, to improve performance by allowing other quads to be issued at that pixel position.

In the present application, the words "configured to . . ." are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. An apparatus for graphics processing, comprising:
a warp processing unit to process a plurality of threads of processing on respective graphics fragments;
wherein the warp processing unit is configured to control, in dependence on a warp program counter shared between the plurality of threads, fetching of a next instruction to be executed for at least some of the plurality of threads;
the warp processing unit comprises registers to store architectural state data for the plurality of threads;
in response to a determination that a given subset of threads is to be discarded when at least one other subset of threads of the plurality of threads is to continue, the warp processing unit is configured to process the given subset of threads in a discarded state; and
for a thread processed in the discarded state, the warp processing unit is configured to continue execution of instructions for the discarded thread, and at least one of:
the warp processing unit is configured to suppress generation of data access messages triggered by the discarded thread, said data access messages comprising messages requesting access to data other than said architectural state data stored in the registers of the warp processing unit; and
the apparatus for graphics processing is configured to enable at least one processing operation, which would be deferred until completion of the discarded thread had the thread not been discarded, to be commenced independently of an outcome of the discarded thread;
wherein the plurality of threads comprise at least two groups of threads, and the warp processing unit is configured to prevent switching of a thread of a given group from a non-discarded state to the discarded state part-way through execution of that thread, when at least one other thread of the given group is to continue in the non-discarded state;
wherein each group of threads comprises four threads corresponding to a 2×2 quad of graphics fragments; and
wherein the warp processing unit is configured to switch the threads of a given group from the non-discarded state to the discarded state in response to a determination that all threads for the given group are to be discarded while threads of at least one other group are to continue.

2. The apparatus according to claim 1, wherein the warp processing unit is configured to maintain an active mask indicative of which of the plurality of threads are active threads which are to execute the next instruction fetched in dependence on the warp program counter, and a pending mask indicative of which of the plurality of threads were previously active but are inactive due to divergence between the control flow taken by respective threads of the plurality of threads.

3. The apparatus according to claim 1, wherein the warp processing unit is configured to maintain an active mask indicative of which of the plurality of threads are active threads which are to execute the next instruction fetched in dependence on the warp program counter, and a pending mask indicative of which of the plurality of threads were previously active but are inactive due to divergence between the control flow taken by respective threads of the plurality of threads; and
the warp processing unit is configured to switch all active threads indicated by the active mask for a given group from the non-discarded state to the discarded state in response to a determination that all the active threads for the given group are to be discarded, when the pending mask indicates that there are no pending threads for the given group and threads of at least one other group are to continue.

4. The apparatus according to claim 1, wherein the warp processing unit is responsive to clauses of instructions within a common program executed for the plurality of threads, to execute each clause of instructions as a block of instructions with sequential control flow.

5. The apparatus according to claim 4, wherein the warp processing unit is incapable of updating an active mask part-way through processing of a given clause, the active mask indicating which of the plurality of threads are active threads which are to execute the next instruction fetched in dependence on the warp program counter.

6. The apparatus according to claim 4, wherein the warp processing unit is capable of switching a thread from a non-discarded state to the discarded state part-way through processing of a given clause.

7. The apparatus according to claim 6, wherein in response to completion of processing of the given clause when a given thread was switched from the non-discarded state to the discarded state part-way through processing of the given clause, the warp processing unit is configured to switch the given thread to a terminated state;
wherein the warp processing unit is configured to suppress execution of instructions for threads in the terminated state.

8. The apparatus according to claim 4, wherein in response to a determination that all of the plurality of threads processed by the warp processing unit are to be discarded, the warp processing unit is configured to terminate processing of the plurality of threads part-way through processing of a current clause.

9. The apparatus according to claim 1, wherein the warp processing unit is configured to process a helper thread in the discarded state from the start of processing of the helper thread.

10. The apparatus according to claim 1, wherein the warp processing unit is configured to determine that a given thread is to be discarded in response to a kill signal indicating that the graphics fragment corresponding to the given thread will be obscured in a rendered image by another graphics fragment processed by the apparatus.

11. The apparatus according to claim 1, wherein the warp processing unit is configured to determine that a given thread is to be discarded in response to execution of a discard instruction for the given thread.

12. The apparatus according to claim 1, wherein said data access messages comprise requests to load data from, or store data to, at least one of:

a tile buffer or frame buffer to store previously calculated pixel values for at least a portion of a rendered image frame;

a depth buffer to store depth values for pixels of at least a portion of the rendered image frame;

a texture buffer to store texture data referenced in threads of processing performed by the warp processing unit; and an attribute data store to store attributes calculated for a given graphics fragment prior to issuing a corresponding thread of processing to the warp processing unit.

13. The apparatus according to claim 1, wherein said at least one processing operation comprises a thread of processing performed for another graphics fragment at the same position in a rendered image as the graphics fragment corresponding to the thread in the discarded state.

14. The apparatus according to claim 1, comprising a plurality of said warp processing units each having a separate warp program counter.

15. An apparatus for graphics processing, comprising:
means for processing a plurality of threads of processing on respective graphics fragments;
wherein the means for processing is configured to control, in dependence on a warp program counter shared between the plurality of threads, fetching of a next instruction to be executed for at least some of the plurality of threads;
the means for processing comprises means for storing architectural state data for the plurality of threads;
in response to a determination that a given subset of threads is to be discarded when at least one other subset of threads of the plurality of threads is to continue, the means for processing is configured to process the given subset of threads in a discarded state; and
for a discarded thread in the discarded state, the means for processing is configured to continue executing instructions for the discarded thread, and at least one of:
the means for processing is configured to suppress generation of data access messages triggered by the discarded thread, said data access messages comprising messages requesting access to data other than said architectural state data stored in the means for storing of the means for processing; and
the apparatus for graphics processing is configured to enable at least one processing operation, which would be deferred until completion of the discarded thread had the thread not been discarded, to be commenced independently of an outcome of the discarded thread;
wherein the plurality of threads comprise at least two groups of threads, and the means for processing is configured to prevent switching of a thread of a given group from a non-discarded state to the discarded state part-way through execution of that thread, when at least one other thread of the given group is to continue in the non-discarded state;
wherein each group of threads comprises four threads corresponding to a 2×2 quad of graphics fragments; and
wherein the means for processing is configured to switch the threads of a given group from the non-discarded state to the discarded state in response to a determination that all threads for the given group are to be discarded while threads of at least one other group are to continue.

16. A method for graphics processing, comprising:
processing a plurality of threads of processing on respective graphics fragments using a warp processing unit configured to control, in dependence on a warp program counter shared between the plurality of threads, fetching of a next instruction to be executed for at least some of the plurality of threads, the warp processing unit comprising registers to store architectural state data for the plurality of threads; and
in response to a determination that a given subset of threads is to be discarded when at least one other subset of threads of the plurality of threads is to continue, the warp processing unit processing the given subset of threads in a discarded state;
wherein for a discarded thread in the discarded state, the warp processing unit continues executing instructions for the discarded thread, and at least one of:
the warp processing unit suppresses generation of data access messages triggered by the discarded thread, said data access messages comprising messages requesting access to data other than said architectural state data stored in the registers of the warp processing unit; and
at least one processing operation, which would be deferred until completion of the discarded thread had the thread not been discarded, is enabled to be commenced independently of an outcome of the discarded thread;
wherein the plurality of threads comprise at least two groups of threads, the method includes preventing switching of a thread of a given group from a non-discarded state to the discarded state part-way through execution of that thread, when at least one other thread of the given group is to continue in the non-discarded state;
wherein each group of threads comprises four threads corresponding to a 2×2 quad of graphics fragments; and
wherein the threads of a given group are switched from the non-discarded state to the discarded state in response to a determination that all threads for the given group are to be discarded while threads of at least one other group are to continue.

* * * * *